Figure 1:
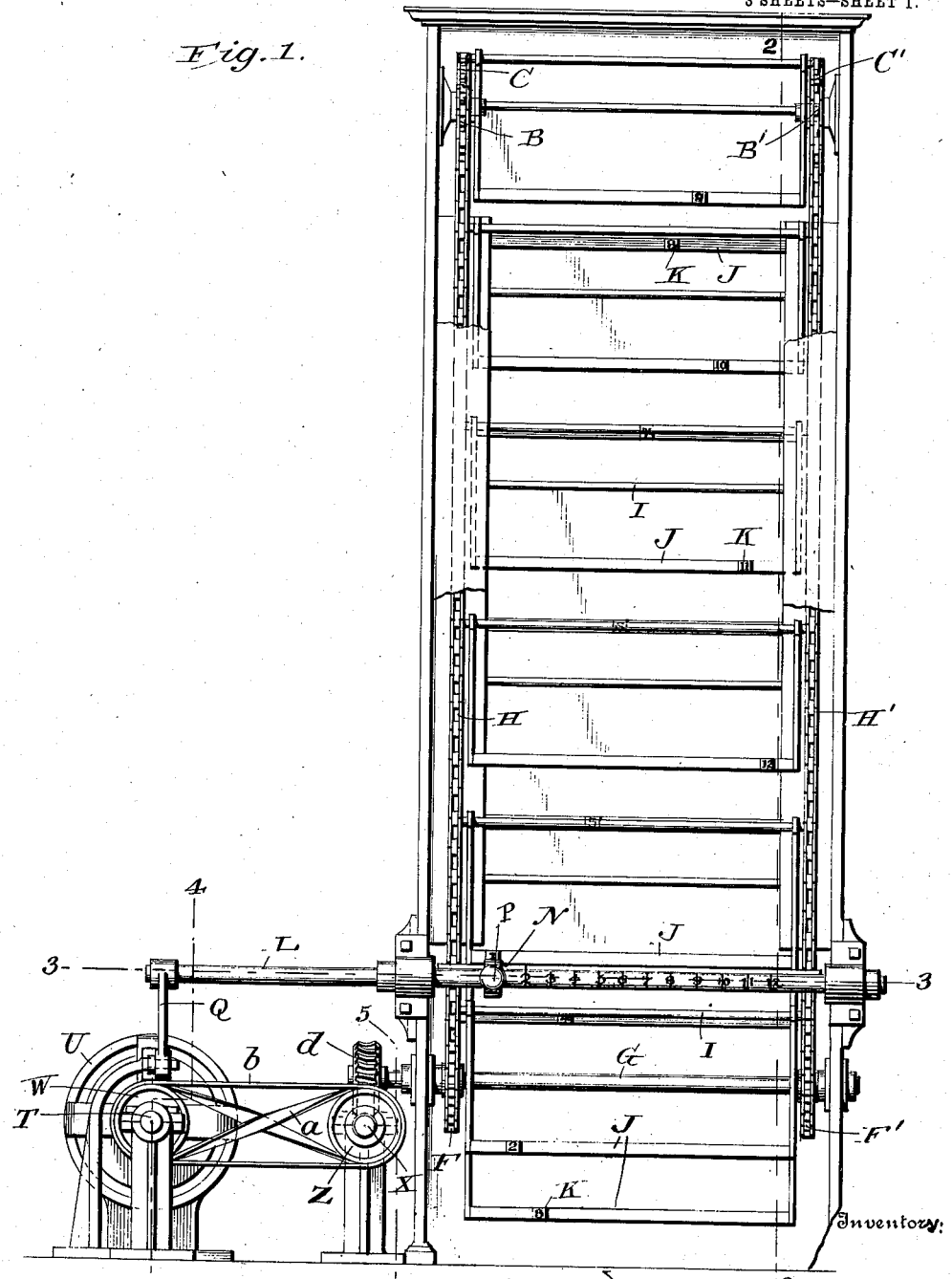

No. 867,804. PATENTED OCT. 8, 1907.
H. J. DAVIS & P. G. AULT.
STORE SERVICE APPARATUS.
APPLICATION FILED MAR. 19, 1907.

3 SHEETS—SHEET 1.

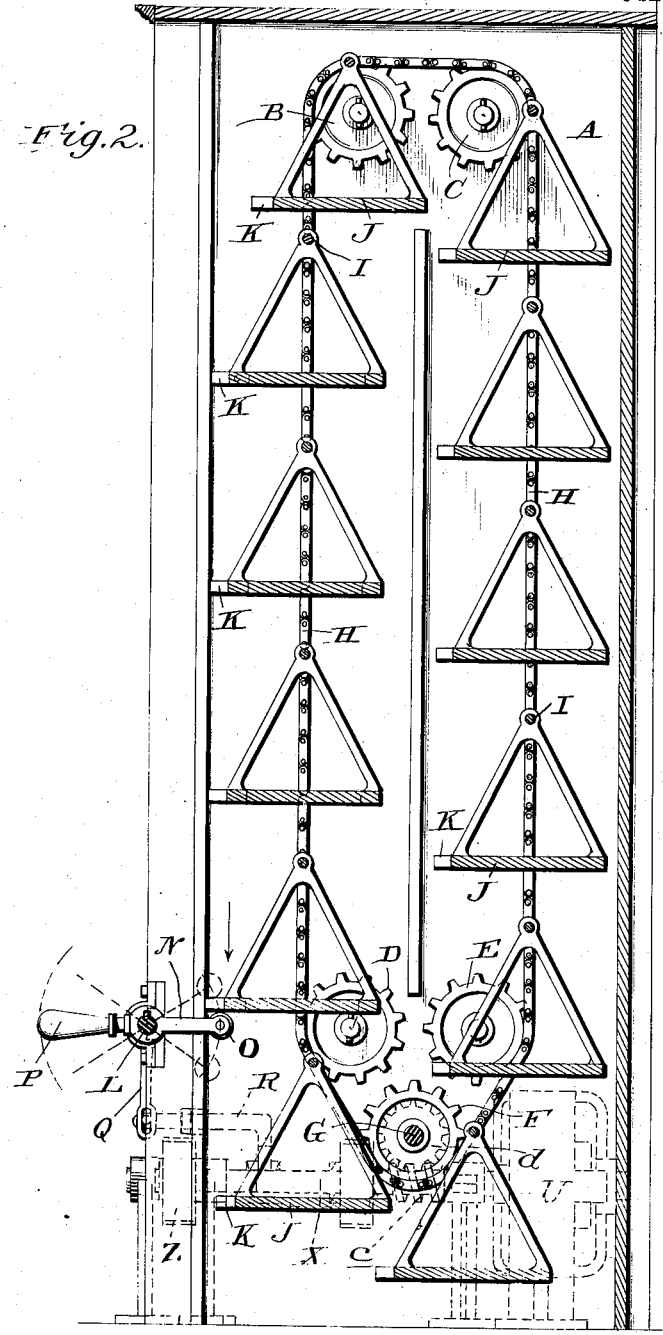

No. 867,804. PATENTED OCT. 8, 1907.
H. J. DAVIS & P. G. AULT.
STORE SERVICE APPARATUS.
APPLICATION FILED MAR. 19, 1907.
3 SHEETS—SHEET 3.
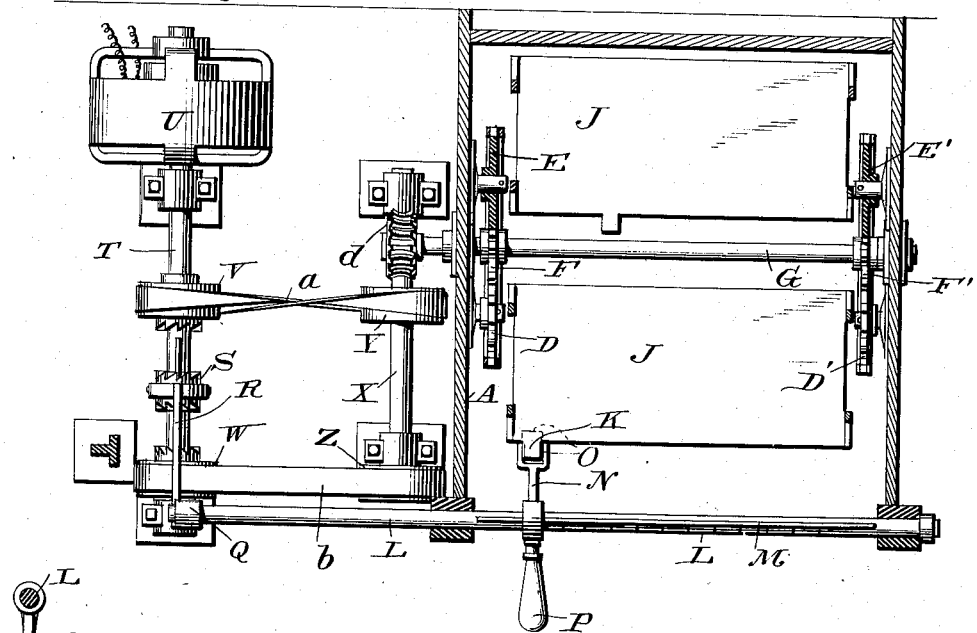
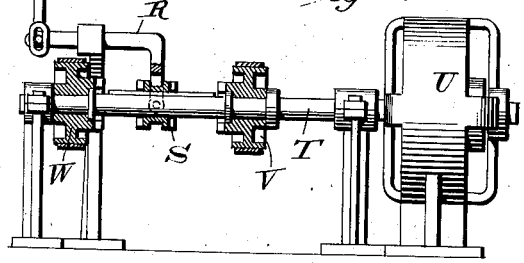
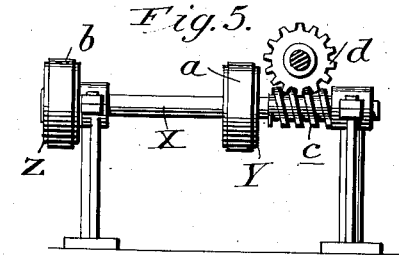
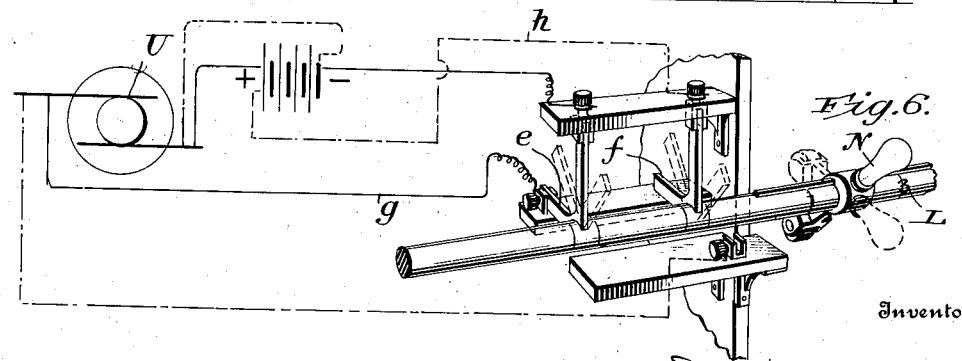
Witnesses
Inventors
Henry J. Davis and Playfair G. Ault,
By Dodge and Sons,
Attorneys.

UNITED STATES PATENT OFFICE.

HENRY J. DAVIS AND PLAYFAIR G. AULT, OF BIRMINGHAM, ALABAMA.

STORE-SERVICE APPARATUS.

No. 867,804.   Specification of Letters Patent.   Patented Oct. 8, 1907.

Application filed March 19, 1907. Serial No. 363,185.

*To all whom it may concern:*

Be it known that we, HENRY J. DAVIS and PLAYFAIR G. AULT, citizens of the United States, residing at Birmingham, in the county of Jefferson and State of Alabama, have invented certain new and useful Improvements in Store-Service Apparatus, of which the following is a specification.

Our present invention pertains to improvements in store service apparatus, the construction and advantages of which will be hereinafter set forth, reference being had to the accompanying drawings, wherein:

Figure 1 is a front elevation of the apparatus, portions being broken away to more clearly disclose the structure; Fig. 2 a vertical sectional view, taken on the line 2—2 of Fig. 1; Fig. 3 a horizontal sectional view, taken on the line 3—3 of Fig. 1; Fig. 4 a vertical sectional view, taken on the line 4—4 of Fig. 1; Fig. 5 a similar view, taken on the line 5—5 of Fig. 1; and Fig. 6 a perspective diagrammatic view showing a modified arrangement of actuating means for causing the movement of the shelves in one or the other direction.

The object of the invention is to provide an apparatus wherein a series of shelves carried by endless belts or chains may be positioned so that any one shelf may be brought to the desired level and caused to come to rest at that point.

The invention may be said to comprise endless belts or chains with a series of shelves attached thereto, combined with means for causing said chains to run in one or the other direction, and an automatic device operating in conjunction with the shelves to throw the mechanism out of operation and thus arrest the movement of the endless chains or belts.

Referring first to Figs. 1 to 5 inclusive, A denotes a casing or housing in which the endless chains or belts and the shelves are mounted. At the upper end of one of the side walls of the casing are secured sprocket-wheels B and C, and upon the opposite wall companion sprocket-wheels B' and C'. At the lower portion of the casing, upon one side, are secured two sprocket-wheels D, E and a sprocket F, the latter being a driving sprocket made fast to the driving shaft G. Similar sprocket-wheels D', E' are mounted upon the opposite side of the casing and a third sprocket F' is secured to the driving shaft G. The sprockets B, C, D, E and B', C', D', E' are idlers, and an endless chain H or H' is passed about each set of sprockets and about the driving sprocket F or F'. Cross-bars or rods I extend from one chain to the other, and shelves J are suspended from said rods. Each shelf is provided with a forwardly-extending projection K, the projections upon the various shelves standing out of alinement, as best shown in Figs. 1 and 3. Said projections will be provided with a numeral to designate the particular shelf.

A rocker-shaft L extends across the front of the frame or casing, the shaft being provided with a spline or feather M, said spline working through a spline-way or seat formed in a lever N mounted upon the shaft. The lever extends inwardly in the path of the projections K, and by preference will be provided with an antifriction roller O, which will contact with the projections K as the shelves are moved up or down. The lever is provided with a handle P by which it may be shifted longitudinally of the rocker-shaft L to bring the roller O into alinement with one or another of the projections K, as desired.

The shaft L will be provided with a scale or graduations corresponding to the position of the projections K, so that the operator may, by merely shifting the lever, bring it into alinement with the projection of any particular shelf.

As will be best seen upon reference to Figs. 1 and 3, the shaft L extends to the left of the casing, and is provided with a depending arm Q, which in turn is connected with a shifter arm R for the sliding clutch-member S. Said member is mounted upon a shaft T, driven by a suitable motor U, and upon which are loosely mounted band-pulleys V and W.

X denotes a second shaft arranged parallel to the shaft T and provided with band-pulleys Y and Z. A crossed belt *a* passes about the pulleys V and Y, and a straight belt *b* around the pulleys W and Z.

The clutch member S is shown in its medial position in the drawings, but when it is thrown into connection with one or the other of the clutch members secured to the pulleys V and W motion will be imparted to one or the other of said pulleys, and consequently the shaft X will be rotated in one or the other direction. Said shaft is provided with a worm *c* (see Fig. 5) which meshes with a worm-wheel *d* secured upon the outer end of the shaft G. Any motion imparted to the shaft G and to the endless chains H and H' will cause the shelves to ascend or descend, according as the clutch member S is thrown into operative relation with the clutch member of the pulley V or of pulley W. The operator can, therefore, by shifting the lever N along the shaft L so as to bring it into alinement with the projection K of the particular shelf to be brought into position where the goods may be removed therefrom, and rocking the shaft so as to bring the clutch member S into working relation with one or the other of the pulleys V or W, cause the chains to ascend or descend.

The shelves being consecutively numbered, the operator will throw the lever up or down so as to cause the shelf to take the shortest traverse to the point where it is desired it shall come to rest.

In Fig. 6 is shown a modification of the mechanism for controlling the movement of the chains. In said figure L represents the actuating shaft which extends across the front of the apparatus and is provided, as in the former case, with a lever N. Said shaft carries two double-pole switch-arms *e* and *f* which, as shown in said figure, close the circuits $g$ and $h$, respectively, one circuit being open while the other is closed. It will be noted that with the arm $e$ in the position shown in full lines the current will pass from the motor in one direction, and when the shaft is rocked to the full extent in the opposite direction the circuit $g$ will be opened and the circuit $h$ closed. In the medial position, or that shown in dotted lines, both circuits will be open and the motor deënergized and therefore the driving mechanism brought to a standstill. With this arrangement the motor will be connected to the shaft G by a suitable gearing interposed between said shaft and the motor.

Having thus described our invention, what we claim is:

1. In combination with a pair of endless chains or belts; a series of shelves suspended therefrom, each shelf being provided with a projection extending forwardly from the same, the projections of the various shelves being out of alinement; a rocker-shaft; a lever slidably mounted upon said shaft and adapted to be brought into alinement with one or another of said projections; driving mechanism for the chains or belts; and connections intermediate said rocker-shaft and the driving mechanism, whereby when the lever carried by the rocker-shaft comes in contact with one of the projections on the shelves the shaft will be moved and the driving mechanism thrown out of action.

2. In combination with a pair of endless chains or belts; a series of shelves pivotally supported therefrom; a projection extending out from each of said shelves, the projections standing out of alinement; a rocker-shaft; a lever mounted upon said shaft and slidable longitudinally thereof; a motor for actuating said endless chains or belts; and connections between the rocker-shaft and the motor for causing the motor to drive the chains in one or the other direction.

3. In an apparatus of the character specified, the combination of a housing; series of sprockets mounted upon the opposite side walls of said housing; an endless chain passing about each series of sprockets; shelves suspended from said chains; a projection extending outward from the forward face of each shelf, said projections standing out of alinement; a rocker-shaft; a lever slidably mounted upon said shaft and adapted to be struck by one or another of said projections according to the adjustment of the lever; a motor for driving the sprockets and thus imparting motion to the chains; and connections intermediate said motor and the rocker-shaft, whereby the motor may be thrown out of or into action to cause the chains to travel in one or the other direction and to come to rest when a particular shelf has reached the desired position.

4. In an apparatus of the character specified, the combination of a pair of endless chains or belts; a series of shelves pivotally supported therefrom, each of said shelves being provided with a projection extending outward from the forward face thereof; means for driving the chains; and adjustable means coacting with the projections on the shelves to arrest the motion of the driving means, whereby any particular shelf may be brought to position and the movement of the driving chains arrested.

In testimony whereof we have signed our names to this specification in the presence of two subscribing witnesses.

HENRY J. DAVIS.
PLAYFAIR G. AULT.

Witnesses:
J. P. PERKINS,
H. G. COLMER.